(12) United States Patent
Okochi

(10) Patent No.: US 6,558,288 B2
(45) Date of Patent: May 6, 2003

(54) INTERNAL TRANSMISSION DEVICE WITH AUTOMATIC SHIFT MECHANISM FOR A BICYCLE

(75) Inventor: Hiroyuki Okochi, Yamaguchi (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/860,372

(22) Filed: May 18, 2001

(65) Prior Publication Data

US 2002/0183159 A1 Dec. 5, 2002

(51) Int. Cl.$^7$ ................................................ F16H 3/74
(52) U.S. Cl. ........................ 475/297; 475/266; 475/318; 475/324; 192/64
(58) Field of Search ................................. 475/257, 266, 475/293, 296, 297, 318, 324; 192/3.52, 64

(56) References Cited

U.S. PATENT DOCUMENTS

| | | | |
|---|---|---|---|
| 2,844,050 A | * | 7/1958 | Brendel ........................ 192/64 |
| 3,166,171 A | * | 1/1965 | Schwerdhofer et al. ........ 192/64 |
| 3,182,529 A | * | 5/1965 | Schwerdhofer ........... 192/64 X |
| 3,600,974 A | | 8/1971 | Schwerdhofer et al. |
| 3,603,178 A | | 9/1971 | Lutz et al. |
| 3,659,688 A | | 5/1972 | Schulz |
| 4,323,146 A | | 4/1982 | Fukui |
| 4,858,494 A | | 8/1989 | Healy |
| 5,322,487 A | * | 6/1994 | Nagano ........................ 475/297 |
| 5,540,456 A | * | 7/1996 | Meier-Burkamp et al. ..... 192/64 X |
| 5,829,563 A | | 11/1998 | Shoge |
| 6,010,425 A | | 1/2000 | Tabe |

FOREIGN PATENT DOCUMENTS

| | | | | |
|---|---|---|---|---|
| DE | 3432124 | * | 4/1985 | ................ 475/297 |
| GB | 2134195 | * | 8/1984 | ................ 475/297 |
| GB | 2136515 | * | 9/1984 | ................ 475/297 |
| GB | 2249364 | * | 5/1992 | ................ 475/296 |

* cited by examiner

Primary Examiner—Richard M. Lorence
Assistant Examiner—Ha Ho
(74) Attorney, Agent, or Firm—Jeffer, Mangels, Butler & Marmaro LLP

(57) ABSTRACT

An internal transmission device for a bicycle. The device includes a slave member, a driver, a planetary gear mechanism disposed between the driver and the slave member, and an automatic shift control mechanism actuated relative to a rotational angle of the driver in a driving direction. The automatic shift control mechanism includes a first one way clutch, a clutch control member and a first abutment member that is disposed on the inner peripheral surface of the slave member.

51 Claims, 10 Drawing Sheets

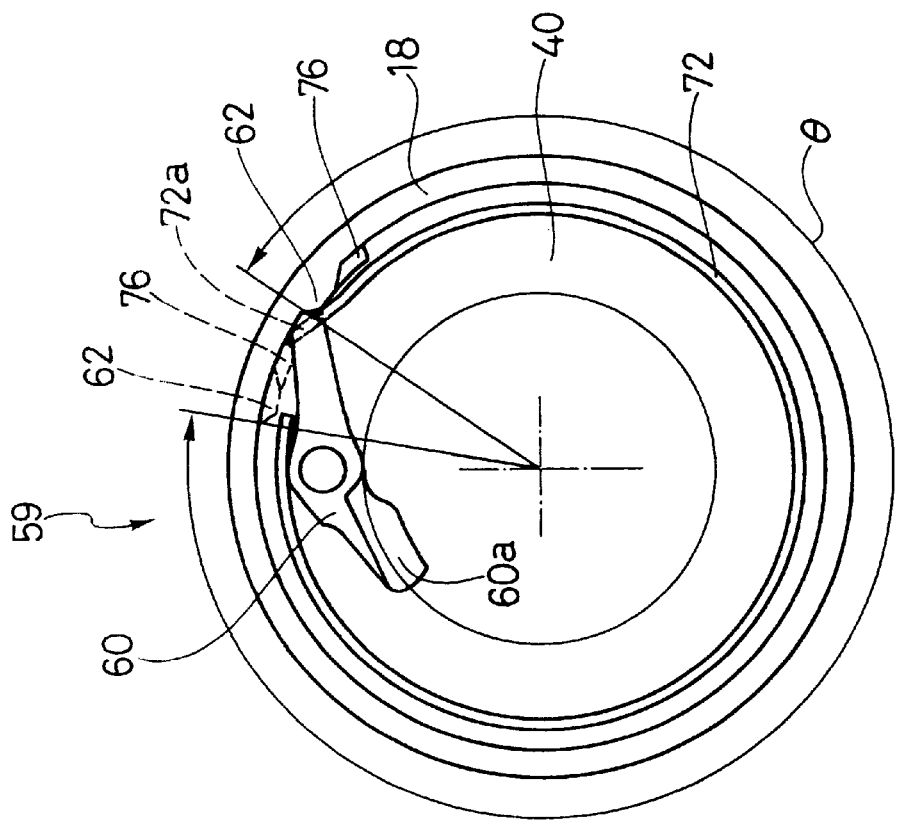
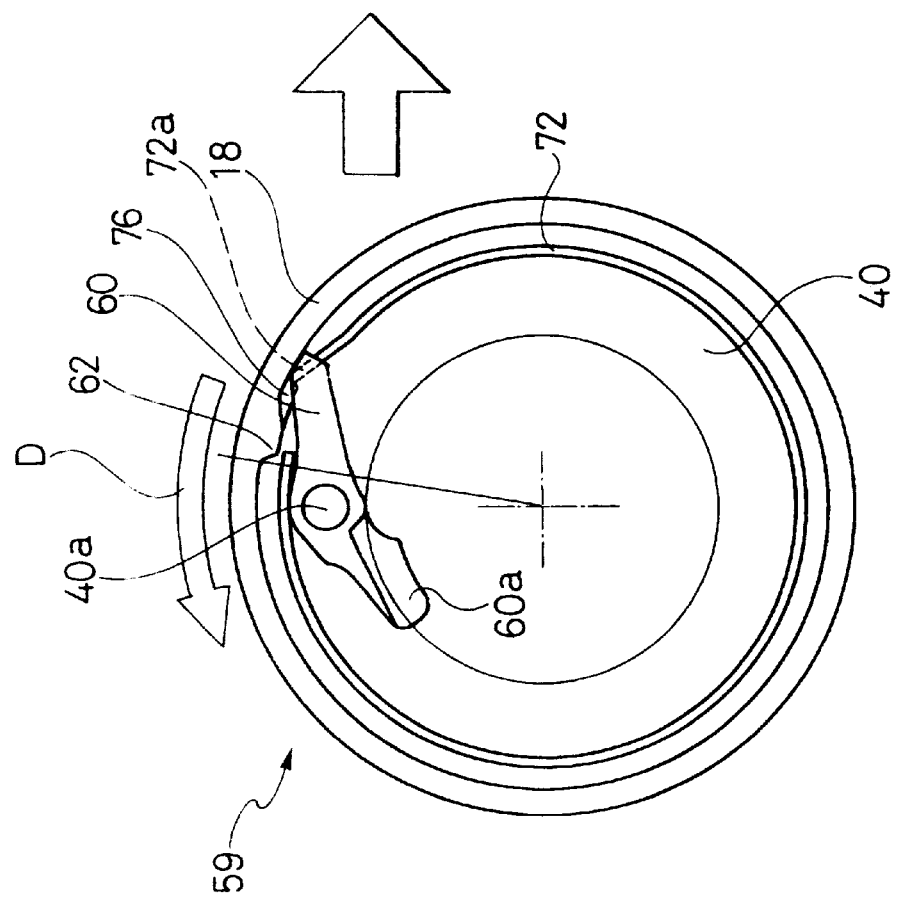
FIG. 6b
FIG. 6a

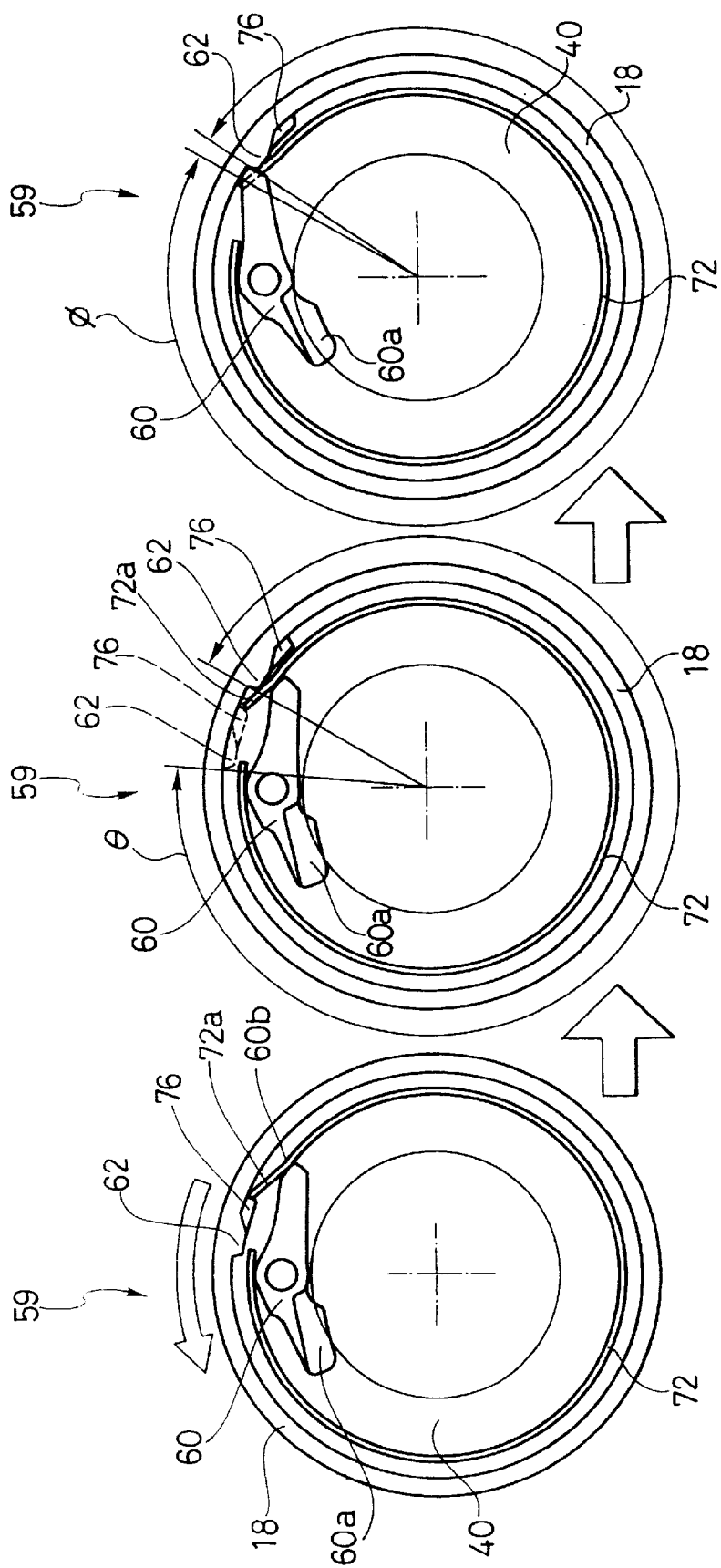

FIG. 8a
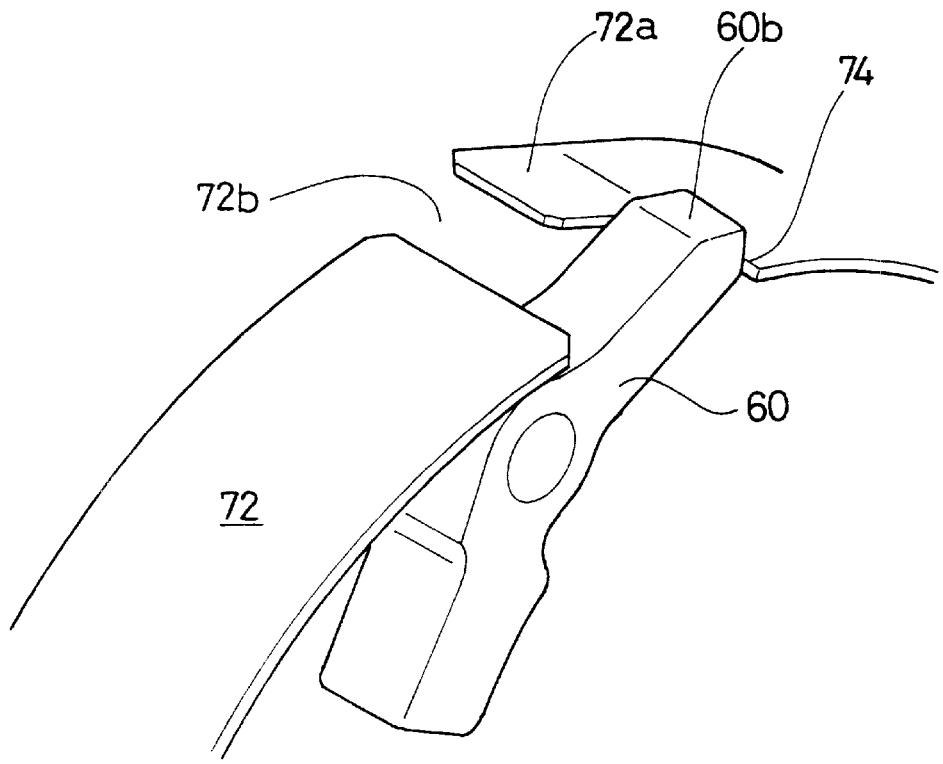
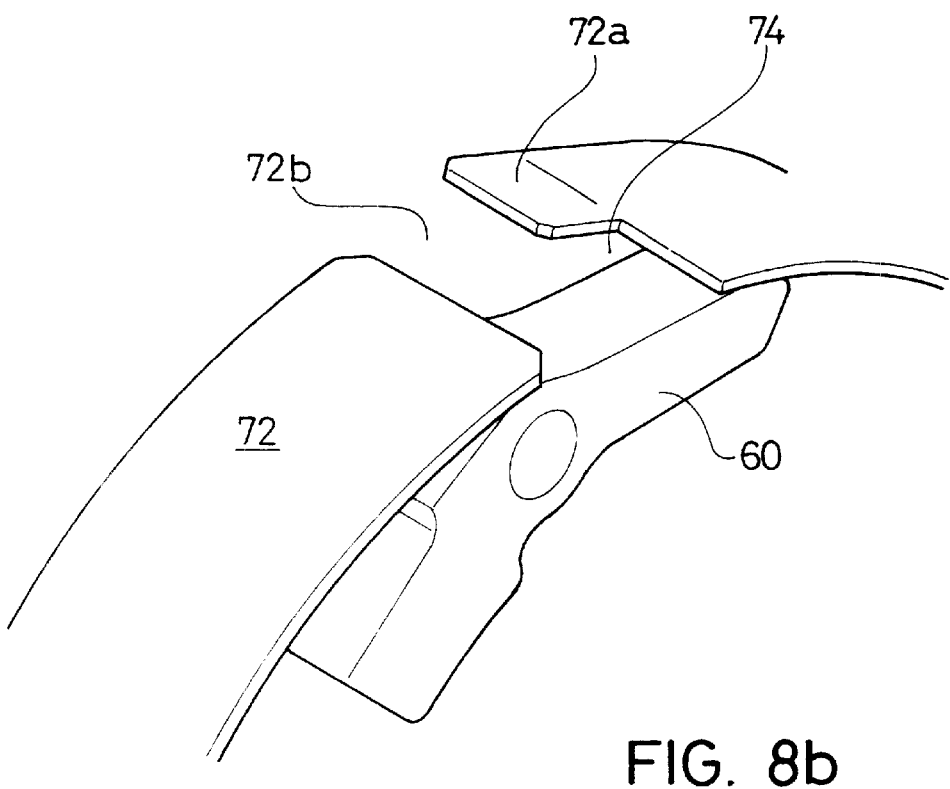
FIG. 8b

INTERNAL TRANSMISSION DEVICE WITH AUTOMATIC SHIFT MECHANISM FOR A BICYCLE

FIELD OF THE INVENTION

The present invention relates generally to bicycle transmissions and, more particularly, to an internal transmission device which automatically shifts gears in accordance with rotation of the hub components.

BACKGROUND OF THE INVENTION

It is sometimes difficult to start pedaling a bicycle from a resting position, because riders often leave the bicycle in a relatively high gear when parking the bicycle, forgetting to shift to a lower gear. To solve this problem, two types of solutions have been proposed. One is an electrical solution and the second is a mechanical solution. Electrical solutions typically include a motor, electrical circuitry, a battery and a control device with a shifting mechanism. The control device electrically shifts into a low gear ratio when the bike is stopped. But this solution is expensive and the rider has to change batteries often.

Most mechanical solutions involve a centrifugal force mechanism in the hub that sets the gear ratio at a low gear when the bike is stopped and changes the gear ratio after a predetermined wheel speed is reached. U.S. Pat. No. 3,603,178 shows a bicycle equipped with an internal shifter hub wherein the gear ratio may be shifted automatically in accordance with centrifugal force created by the rotating wheel. Such an internal shifter hub comprises a hub axle, a driver capable of rotating about the hub axle, a hub shell, a planet gear mechanism for changing the speed of rotation of the driver and transmitting the result to the hub shell, a clutch mechanism for transmitting the output of the planet gear mechanism to the hub shell or stopping such transmission, a clutch-switching mechanism for switching the clutch mechanism by centrifugal force, and a support sleeve disposed between the planet gear mechanism and the hub shell.

The planet gear mechanism comprises an inner-tooth gear, a sun gear, a plurality of planet gears for meshing with the inner-tooth gear and the sun gear, and a planet gear carrier for supporting the plurality of planet gears. The planet gear carrier is formed integrally with the driver. The support sleeve is rotatably supported on the hub axle and is joined by a serrated joint with the planet gear carrier. A one-way clutch is mounted between the support sleeve and the hub shell.

The clutch mechanism has a ratchet pawl disposed between the inner-tooth gear and the hub shell, links the two when the ratchet pawl is in an engaged position, and disengages the two when the ratchet pawl is in a disengaged position. The hub shell is driven in an up shift mode via the planet gear mechanism when the clutch mechanism is in the engaged position, and the hub shell is driven while being directly linked to the driver when the ratchet pawl is in the disengaged position.

The clutch-switching mechanism comprises a weight member that swings by centrifugal force and a control member that rotates in response to swinging of the weight member. The weight member and control member are mounted on a weight support, itself mounted rotatably on the support sleeve. The weight support is nonrotatably linked to the inner-tooth gear.

The control member uses circular movement to switch the ratchet pawl of the clutch mechanism between the engaged position and the disengaged position. An upright control pin for interlocking with the control member is provided with a slit for interlocking with the control pin and with a control hole for controlling the clutch pawl. The interlocking of the control pin and slit converts the rocking movement of the weight member into the circular movement of the control member.

In such a conventional internal shifter hub, the ratchet pawl of the clutch mechanism is kept by the control hole of the control member in a position in which the pawl is separated from the hub shell until a rotational speed promoting the outward swinging of the weight member is reached. During this time, rotation transmitted from the sprocket to the driver is transmitted from the carrier to the hub shell via the support sleeve and the one-way clutch, and the hub shell is driven in a direct-coupled mode. When a certain rotational speed is achieved and the weight member has swung outward, the control pin turns while sliding in relation to the slit and causes the control member to rotate. When this happens, the ratchet pawl, controlled by the control hole, rises to the engaged position in which it is interlocked with the hub shell. In this state, the rotation that has been transmitted from the sprocket to the driver is upshifted and outputted from the carrier to the inner-tooth gear via the planet gears, and is further transmitted to the hub shell via the clutch mechanism, thus driving the hub shell in to an upshifted mode.

In this arrangement wherein the clutch mechanism is switched and the speed is changed using centrifugal force, the extent of rocking of the weight member is very small because the weight member has a limited housing space. Additionally, the control pin has a short revolution path in relation to the rocking of the weight member because the control pin is disposed in the vicinity of the center of rocking of the weight support. The control member is therefore unable to rotate over significant distances, making it necessary that the ratchet pawl be switched between the engaged position and the disengaged position by a very small amount of circular movement.

Another drawback is that large centrifugal forces are difficult to obtain because of the limited housing space for the weight member. It is therefore necessary to increase the efficiency with which the rocking movement is converted to a circular movement in the clutch-switching mechanism. With the conventional arrangement described above, however, the efficiency with which the rocking movement is converted to a circular movement is low, the circular movement of the control member is impeded in relation to the rocking of the weight member, and smooth shifting is difficult to achieve because the control pin interlocked with the slit must slide along the slit to convert the rocking movement of the weight member into the rotational movement of the control member.

Accordingly, it is desirable to provide an interior shift device for a bicycle that is simple in construction, lightweight and overcomes the disadvantages of the prior art.

SUMMARY OF THE PREFERRED EMBODIMENTS

In accordance with a first aspect of the present invention there is provided an internal transmission device for a bicycle. The device includes a slave member, a driver, a planetary gear mechanism disposed between the driver and the slave member, and an automatic shift control mechanism actuated relative to a rotational angle of the driver in a driving direction. The automatic shift control mechanism includes a first one way clutch, a clutch control member and a first abutment member that is disposed on the inner peripheral surface of the slave member.

In a preferred embodiment, the automatic shift control mechanism also includes a second abutment member disposed on the inner peripheral surface of the slave member. The second abutment member is preferably adjacent to and staggered with the first abutment member. The first abutment member is positioned to be engaged by the first one way clutch and the second abutment member is a positioned to be engaged by the clutch control member. In a preferred embodiment, the clutch control member comprises a clutch cage, such as a pawl cage, and is rotatable relative to the planetary gear mechanism and is also rotatable with the slave member. Preferably the clutch control member has an end that is bent radially outwardly. In operation, a tip end of the first one way clutch preferably rotates in a direction opposite to the driving direction. The planetary gear mechanism may be disposed radially inwardly of the slave member or the driver/ring gear, or it may be disposed laterally adjacent to the slave member.

In another preferred embodiment, the device includes an axle and a clutch body that is rotatable about the axle and movable in an axial direction. The clutch body may include a key member and be externally operated by a push rod and may be positioned in at least first, intermediate and second positions, wherein the gear ratio is fixed when the clutch body is in the first position, the gear ratio is automatically changed from a low gear ratio to a middle gear ratio in the intermediate position, and wherein the gear ratio is automatically changed from a middle gear ratio to a high gear ratio in the second position.

The automatic shift control member may be actuated relative to the rotational angle of the driver in the driving direction with different rotational angles between the ring gear and the slave member.

In accordance with another aspect of the present invention there is provided an internal transmission device for a bicycle. The device includes a hub axle having a sun gear formed integrally therewith, a driver rotatably mounted to the hub axle, a slave member rotatably mounted to the hub axle and rotatable independently of the driver, a planet gear mechanism, and an automatic shift control mechanism that is actuated when the slave member rotates relative to the driver a predetermined rotational angle θ. The driver includes a first clutch pawl pivotably mounted thereon that pivots between an engaging position and a disengaging position. The slave member has a set of teeth formed on an inner surface thereof. The planetary gear mechanism includes a ring gear having first and second sets of inner teeth, a planet gear, and a carrier rotatably mounted on the hub axle and carrying the planet gear. The planet gear is disposed between the sun gear and the second set of teeth on the ring gear and the carrier has a second clutch pawl pivotably mounted thereon for engaging the set of teeth on the inner surface of the slave member. The automatic shift control mechanism includes a third clutch pawl mounted on the ring gear, a clutch control member having an end that is bent radially outwardly and that includes a notch defined therein, and a first abutment member disposed on the inner peripheral surface of the slave member.

In accordance with yet another aspect of the present invention there is provided a method of power transmission in a bicycle component. The method includes the steps of rotationally powering a driver, wherein the driver rotationally powers a ring gear, wherein the ring gear rotationally powers a planet gear carrier, wherein the planet gear carrier rotationally powers a slave member, actuating an automatic shift control mechanism by engaging a first one way clutch on the ring gear with the slave member, and wherein the first one way clutch rotationally powers the slave member independently of the planet gear carrier. The automatic shift control mechanism is actuated relative to a rotational angle of the driver in the driving direction.

In accordance with yet another aspect of the present invention there is provided an internal transmission device for a bicycle including an axle, a slave member rotatably mounted to the axle, a driver rotatably mounted to the axle, the driver for transmitting power to a ring gear, a clutch control member, a planet gear mechanism including a planet gear carrier, an automatic shift control mechanism that is actuated relative to a rotational angle of said driver in a driving direction, a low gear configuration wherein the ring gear transmits power to the slave member through the planet gear carrier, and a high gear configuration wherein the ring gear transmits power directly to the slave member.

In accordance with yet another aspect of the present invention there is provided an internal transmission device for a bicycle including a driver, a slave member having a first portion, a planetary gear mechanism disposed between the driver and the first portion of the slave member, and an automatic shift control mechanism actuated relative to a rotational angle of the driver in a driving direction. The automatic shift control mechanism includes a first one way clutch, a clutch control member and a first abutment member. The clutch control member partially surrounds and is rotatable independent of the first portion of the slave.

In accordance with yet another aspect of the present invention there is provided an internal transmission device for a bicycle comprising including an axle, a slave member rotatably mounted to the axle, a driver rotatably mounted to the axle, a planetary gear mechanism disposed between the driver and the slave member, a clutch body movable in an axial direction and positionable in at least first, intermediate and second positions, and an automatic shift control mechanism actuated relative to a rotational angle of the driver in a driving direction. The automatic shift control mechanism comprises a first one way clutch, a clutch control member and a first abutment member. The automatic shift control mechanism is not actuated when the clutch body is in the first position. The automatic shift control mechanism shifts between a low gear ratio and a middle gear ratio when the clutch body is in the intermediate position. The automatic shift control mechanism shifts between a middle gear ratio and a high gear ratio when the clutch body is in the second position.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 6a is a side elevational view of the automatic shift control mechanism, including the slave member, clutch cage and clutch pawl in a first starting position wherein the clutch pawl is engaged with the clutch cage, but not the first ratchet tooth.

FIG. 6b is a side elevational view of the automatic shift control mechanism, including the slave member, clutch cage and clutch pawl in an upshifted position wherein the clutch pawl is engaged with the clutch cage and the first ratchet tooth after the slave member has rotated (from the first starting position) relative to the ring gear and clutch cage.

FIG. 7a is a side elevational view of the automatic shift control mechanism, including the slave member, clutch cage and clutch pawl in a second starting position wherein the clutch pawl is not engaged with the clutch cage or the first ratchet tooth, but is disposed radially inwardly of the clutch cage.

FIG. 7b is a side elevational view of the automatic shift control mechanism, including the slave member, clutch cage and clutch pawl in a position wherein the clutch pawl is not engaged with the clutch cage or the first ratchet tooth, but is disposed radially inwardly of the clutch cage. The clutch cage is engaged with the second ratchet tooth after the slave member has rotated (from the second starting position) relative to the ring gear and clutch cage.

FIG. 7c is a side elevational view of the automatic shift control mechanism, including the slave member, clutch cage and clutch pawl in an upshifted position wherein the clutch pawl is engaged with the clutch cage and the first ratchet tooth after the slave member has rotated with the clutch cage.

FIG. 8a is a partial perspective view of clutch pawl 60 engaged with the clutch cage as shown in FIGS. 6a, 6b and 7c.

FIG. 8b is a partial perspective view of clutch pawl 60 disengaged from the clutch cage as shown in FIGS. 7a and 7b.

Like numerals refer to like parts throughout the several views of the drawings.

DETAILED DESCRIPTION OF THE PREFERRED EMBODIMENTS

Generally, the present invention provides for a low gear ratio in the rear hub of a bicycle or the like, when the bicycle is at a starting or resting position. Once the rider has rotated the sprocket in the driving direction a predetermined number of times (typically just a few), the gear ratio is automatically shifted to a higher ratio. It will be appreciated that terms such as "left," "right," "up," "down," "clockwise," "counter-clockwise," "forward," "above," "forwardly" and other positionally descriptive terms used hereinbelow are used merely for ease of description and refer to the orientation of the components as shown in the Figures. It should be understood that any orientation of the elements described herein is within the scope of the present invention.

Figure 1:
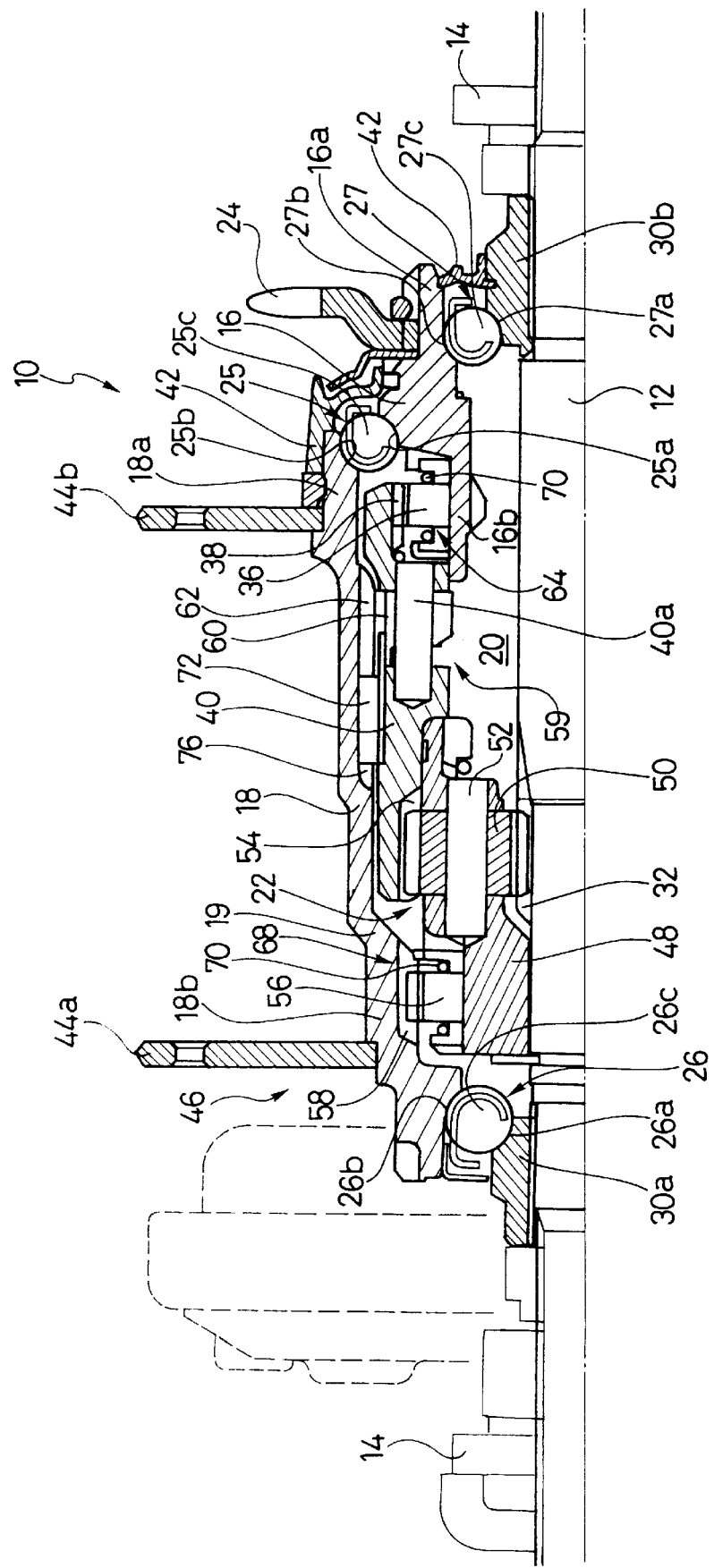
FIG. 1 is a partial cross-sectional side view of an internal shifting hub showing clutch pawl 60 in the disengaged position, in accordance with a first embodiment of the present invention.
Figure 2:
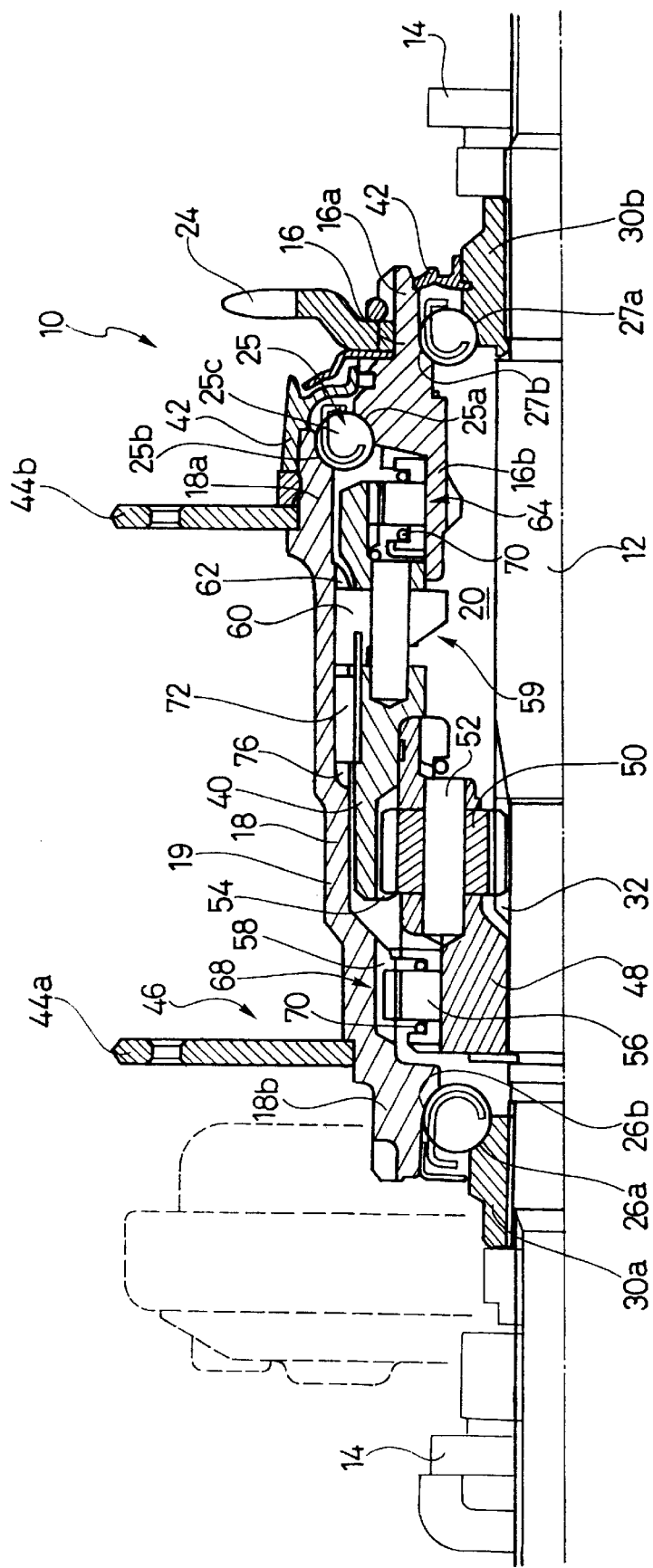
FIG. 2 is a partial cross-sectional side view of the internal shifting hub of FIG. 1 showing clutch pawl 60 in the engaged position.

Referring to FIGS. 1–2, an internal shifting hub 10 for a bicycle according to a first embodiment of the invention is shown. As shown in FIG. 1, internal shifting hub 10 comprises a hub axle 12 fixed in the rear fork ends 14, a driver 16 rotatably mounted around the outside on one end of the hub axle 12, a slave member 18 that is disposed farther outward around the outside of the hub axle 12 and the driver 16 that is linked to the rear wheel (not shown) and which defines a slave member interior 20, a planetary gear mechanism 22 disposed in the slave member interior 20, and a sprocket 24 rotationally coupled to the driver 16. The slave member 18 includes a hub shell 19. The right end of the slave member 18 is rotatably supported by a bearing component 25 seated on the driver 16, and the left end of the slave member 18 is rotatably supported by a bearing component 26 seated on a cone member 30a fixed to the hub axle 12. The driver 16 is rotatably supported by a bearing component 27 seated on a cone member 30b fixed to the hub axle 12.

As noted above, the hub axle 12 is fixed to the rear fork ends 14 of the bicycle frame body (not shown). The sun gear 32 of the planetary gear mechanism 22 (described below) is disposed on and preferably formed integrally with the hub axle 12. Hub cone members 30a and 30b having arm-shaped hub cone seats 26a and 27a for the bearing components 26 and 27, respectively, are screwed onto the mounting portions of the hub axle 12 that lie inward in relation to the rear fork ends 14. The bearing component 25 comprises ball race surfaces 25a and 25b, and a plurality of balls 25c interposed between the ball race surfaces 25a and 25b. The bearing component 26 comprises the hub cone surface 26a, a ball race surface 26b, and a plurality of balls 26c interposed between the ball race surface 26b and the hub cone surface 26a. The bearing component 27 comprises the hub cone surface 27a, a ball race surface 27b, and a plurality of balls 27c interposed between the ball race surface 27b and the hub cone surface 27a.

Driver 16 is a member for transmitting the rotation of the sprocket 24. As shown in FIG. 1, the driver 16 comprises a first portion 16a to which the sprocket 24 is nonrotatably affixed and a second portion 16b to which a one way clutch (preferably clutch pawl 36) is affixed. The clutch pawl 36 is part of clutch mechanism 64 described below. Clutch pawl 36 is designed to engage a set of teeth 38 on the right side of the ring gear 40 of the planetary gear mechanism 22 (described below). The right end of the first portion 16a of the driver 16 is rotatably supported by bearing component 27.

Seals 42 surround the outer areas around the driver 16, cone 30b and sprocket 24 to protect against foreign objects, such as dust, moisture and the like from getting into the slave member interior 20.

The slave member 18, which may be a cylindrical member made of steel or other rigid material, preferably has a stepped shape having a larger diameter end 18a and a smaller diameter end 18b. The driver 16 is preferably housed in the larger diameter end 18a and the planetary gear mechanism 22 extends from the larger diameter end 18a to the smaller diameter end 18b. It will be understood that in another embodiment, the slave member 18 can have a constant diameter across its entire length. Hub flanges 44a and 44b for securing the spokes (not shown) of the rear wheel (not shown) are integrally formed on the outer peripheral surfaces of the mechanism housing 46.

The planetary gear mechanism 22 comprises the sun gear 32 formed on the hub axle 12, the ring gear 40, a planet carrier 48 rotatably mounted on the hub axle 12, and at least one planet gear 50 rotatably supported on the carrier 48. Preferably the planetary gear mechanism 22 includes three planet gears 50 circumferentially disposed about the sun gear 32. The carrier 48 is preferably shaped as a collar flange with the hub axle 12 passing through it. A gear axle 52 for rotatably supporting the planet gear 50 is fixed to the carrier 48. The planet gear 50 meshes with a set of teeth 54 on the left side of the ring gear 40 and the sun gear 32. The carrier 48 includes a one way clutch (preferably clutch pawl 56) that selectively meshes with a set of ratchet teeth 58 located on the inner peripheral surface of the slave member 18. Clutch pawl 56 is part of clutch mechanism 68 described below.

As best shown in FIGS. 6a and 6b, located radially inwardly of the slave member 18 is an automatic shift control mechanism 59. The automatic shift control mechanism 59 preferably includes a one way clutch (preferably a clutch pawl 60), an abutment member 62 that is located on the inner peripheral surface of the slave member 18 and a clutch control member or clutch cage 72. A spring member 70 (shown in FIG. 1) is also included for biasing clutch pawl 60. Clutch pawl 60 is allowed to alternate between an engaged state, as shown in FIG. 6a (it will be understood that engaged state means that clutch pawl 60 is in a position to engage first ratchet tooth 62, but that it does not necessarily mean that clutch pawl 60 is engaged with first ratchet tooth 62, as is evident in FIG. 6a) and a disengaged state as shown in FIG. 7a. The clutch pawl 60 is normally biased in the engaged state. The operation of the elements of the automatic shift control mechanism 59 will be described more fully below.

In a preferred embodiment, clutch pawl 60 is disposed on the ring gear 40. Preferably, clutch pawl 60 is pivotably secured to the ring gear 40 on an axle 40a so that it is adapted to selectively mesh with abutment member 62 located on the inner peripheral surface of the slave member 18. Preferably, abutment member 62 is a first ratchet tooth 62.

As shown in FIGS. 1 and 2, the internal shifting hub 10 also includes clutch mechanisms 64 and 68. Clutch mechanism 64 includes ratchet teeth 38 formed as sawteeth on the inner peripheral surface of the ring gear 40, clutch pawl 36 and a spring member 70 for biasing the clutch pawl 36. The clutch pawl 36 is mounted on the outer peripheral surface of the second portion 16b of the driver 16, and is allowed to alternate between an engaged state in which it meshes with the ratchet teeth 38 and a disengaged state in which it is separated from the ratchet teeth 38. The clutch pawl 36 is normally biased in the engaged state.

Clutch mechanism 68 includes ratchet teeth 58 formed as sawteeth on the inner peripheral surface of the slave member 18, clutch pawl 56 and a spring member 70 for biasing the clutch pawl 56. The clutch pawl 56 is mounted on the outer peripheral surface of the carrier 48, and is allowed to alternate between an engaged state in which it meshes with the ratchet teeth 58 and a disengaged state in which it is separated from the ratchet teeth 58. In clutch mechanism 68, the clutch pawl 56 is normally raised into the engaged state, and the rotation of the carrier 48 is transmitted to the slave member 18 when the carrier rotates in the driving direction. No rotation is transmitted when the slave member 18 rotates in the driving direction at a higher speed than does the carrier 48 (as a result of the slave member 18 being powered by clutch pawl 60 as described below).

As shown in FIGS. 1, 2, and 6–8 a clutch cage 72 partially surrounds ring gear 40. The clutch cage 72 is formed with a circular shape having a gap 72b between its ends. One of the ends 72a is bent radially outwardly, and has a notch 74 formed therein. As best shown in FIG. 8a, clutch pawl 60 is adapted to engage notch 74 (the purpose of which will be described more fully below). Clutch cage 72 is capable of rotation independent of ring gear 40.

Referring to FIGS. 1–2 and 6a–6b, in operation, the first embodiment of the internal shifting hub 10 is a two-speed automatic shifting mechanism. FIG. 1 shows clutch pawl 60 disengaged from first ratchet tooth 62. In this state, the internal shifting hub 10 is in the low gear ratio. FIG. 2 shows clutch pawl 60 engaged with first ratchet tooth 62. In this state, the internal shifting hub 10 is in the high gear ratio.

As shown in FIG. 6a, the inside peripheral surface of the slave member 18 includes a second ratchet tooth 76 adjacent first ratchet tooth 62. As discussed above, first ratchet tooth 62 is adapted to be engaged by clutch pawl 60 (i.e., clutch pawl 60 is aligned with first ratchet tooth 62 in the circumferential direction). Second ratchet tooth 76 is adapted to be engaged by end 72a of clutch cage 72 (i.e., end 72a is aligned with second ratchet tooth 76 in the circumferential direction). When the bicycle is stopped, there is always a free turning of the slave member 18 during which second ratchet tooth 76 engages end 72a of clutch cage 72, thereby rotating clutch cage 72 in a clockwise direction, such that the clutch cage 72 is positioned as is shown in FIG. 6a, which will be referred to herein as the first starting position, where clutch pawl 60 is against second ratchet tooth 76.

When the rider steps on the pedals during startup and propels the bicycle, the resulting rotation is transmitted to the driver 16 via the sprocket 24. At this point, the internal shifting hub 10 is in the low gear ratio. The driver 16 rotationally powers the ring gear 40 because clutch pawl 36 is in the engaging position with the teeth 38 of the ring gear 40. The ring gear 40 rotationally powers the planet gear 50 and therefore the planet gear carrier 48. Rotation of the planet gear carrier 48, via clutch pawl 56, causes rotation of slave member 18. As is shown in FIG. 6a, in this state, clutch pawl 60 is not engaged with first ratchet tooth 62. Therefore, the ring gear 40 is not linked to the slave member 18.

In this low gear, the driver 16 and ring gear 40 are rotating faster than the slave member 18. Therefore, after the rider has turned the cranks (and therefore the driver 16 and ring gear 40) in the driving direction a predetermined number of times, the slave member will travel in a counterclockwise direction (see arrow D in FIG. 6a), relative to the ring gear 40, clutch cage 72 and clutch pawl 60, until clutch pawl 60 engages first ratchet tooth 62. It will be understood that the slave member 18 is not actually traveling in a counterclockwise direction, but that because the ring gear 40 is traveling clockwise faster than the slave member 18, the slave member 18 rotates relative to ring gear 40 in a counterclockwise direction. Once clutch pawl 60 engages first ratchet tooth 62, the ring gear 40 rotationally powers the slave member 18, thereby automatically shifting to the high gear ratio (referred to herein as the upshifted position). Accordingly, because the slave member 18 is rotating faster than the planet carrier 48, clutch pawl 56 is disengaged from ratchet teeth 58, which are part of the slave member 18, and are therefore rotating at the speed of the ring gear 40.

For purposes of establishing gear ratios, the various elements of the planetary gear mechanism 22 are provided with an appropriate number of gear teeth. For exemplary purposes only a low gear ratio of 1:0.73 is selected. In other words, for every one revolution of the driver 16 and the ring gear 40, the slave member 18 rotates 0.73 times. Such a low gear ratio can be provided if the sun gear 32 has sixteen teeth, the left set of teeth 54 on the ring gear 40 has forty four teeth, the planet gear 50 has thirteen teeth and the set of teeth 58 on the slave member 18 includes sixteen teeth.

When the bike is started from the first starting position, the gear ratio is 1:0.73. Accordingly, the ring gear 40 and driver 16 rotate in the driving direction, but the slave member 18 rotates relatively slower than the ring gear 40. In this example, and as is shown in FIG. 6*b*, let us set the distance that the slave member 18 must travel relative to the ring gear 40 from the starting position (FIG. 6*a*) until it engages first ratchet tooth 62 (FIG. 6*b*) to be approximately 335° (more particularly 335° 18' and 23"). One rotation of the ring gear 40 provides 0.73 rotations of the slave member 18. This means that the slave member 18 rotates 0.2666 rotations in the counterclockwise direction (relative to the ring gear 40). 0.2666×360°=96°. In other words, the slave member 18 rotates 96° less than the ring gear 40 for every one rotation of the ring gear 40. 335°/96°=3.49. Therefore, in this example, from the first starting position, the ring gear must rotate 3.49 times before first ratchet tooth 62 rotates relative to the ring gear the 335° necessary for clutch pawl 60 to engage first ratchet tooth 62. In a typical bike, the gear ratio between the front chain wheel and the rear sprocket 24 is about 2:1. 3.49/2=1.75. Therefore, 1.75 rotations of the front chain wheel provides 3.49 revolutions of the rear sprocket 24. In other words, once the rider has started pedaling, the internal shifting hub 10 will shift from low gear to high gear after 1.75 revolutions of the cranks.

It will be understood that the numbers presented above are merely for exemplary purposes and to provide the reader with a better understanding of the invention. Those skilled in the art will be able to tailor the gear ratios and gear sizes to fit a particular application. Accordingly, the numbers and dimensions set forth herein are not limitations on the present invention.

When a bike is stopped, even after the free turning of the slave member 18, clutch pawl 60 is not always positioned as is shown in FIG. 6*a*, but may instead be positioned as shown in FIG. 7*a*, where clutch pawl 60 is positioned radially inwardly of clutch cage 72. This position (the position shown in FIG. 7*a*) will be referred to herein as the second starting position. In this situation, after the driver 16 and ring gear 40 complete 3.49 rotations (as described above), the slave member 18 reaches the position shown in FIG. 7*b*. However, in this position, clutch pawl 60 is still positioned radially inwardly of clutch cage 72 (see FIG. 8*b*). If the clutch cage 72 and ring gear 40 were to continue to rotate at the same rotational speed, the clutch pawl 60 would never engage first ratchet tooth 62 and the high gear would never be reached. Therefore, after the slave member 18 reaches the position shown in FIG. 7*b*, the bent end 72*a* of the clutch cage catches on and engages second ratchet tooth 76 (see FIG. 7*b*). This causes the clutch cage 72 to rotate simultaneously with the slave member 18. Therefore, the clutch cage 72, which was rotating at the same rotational speed as the ring gear 40 will begin rotating at the same rotational speed as the slave member 18 (for every 1 rotation of the ring gear 40 there is 0.73 rotations of the clutch cage 72).

As a result of the rotation of the slave member 18 together with the clutch cage 72, there will come a point where the clutch pawl 60 will reach the gap 72*b* between the ends of the clutch cage 72. Because the clutch pawl 60 is biased toward the engaging position it will extend into gap 72*b*, thereby contacting the inner surface of the slave member 18. The clutch pawl then slides along the inner surface of the slave member 18 until it is received in the notch 74 and engages first ratchet tooth 62 (see FIG. 7*c*), thereby resulting in a shift to the high gear.

As shown in FIG. 7*c*, with the numbers and dimensions provided in the example above, the clutch cage 72 and slave member 18 must travel 355° relative to the ring gear 40 before clutch pawl 60 engages first ratchet tooth 62 and shifting occurs. Using these numbers, we can calculate how many revolutions of the cranks it will take a rider to shift from low to high gear. 335° (to go from the second starting position to the position shown in FIG. 7*b*)+355° (to go from the position shown in FIG. 7*b* to the upshifted position)= 690°. Therefore, it takes 690° of rotation of the slave member 18 (355° of that rotation with the clutch cage 72) relative to the ring gear 40 to shift. 690°/96°=7.2 rotations of the ring gear 40, driver 16 and sprocket 24. 7.2/2=3.6. Accordingly, it takes 3.6 revolutions of the cranks to cause the automatic shift control mechanism 59 to shift from low to high gear when starting from the second starting position.

The internal shifting hub 10 has the following paths of power transmission because of the presence of the driver 16, planetary gear mechanism 22, automatic shift control mechanism 59 and slave member 18:

a downshifted power transmission path (low gear) composed of the sprocket 24, driver 16, clutch mechanism 64, ring gear 40, planet gear 50, carrier 48, clutch mechanism 68 and slave member 18; and a direct-coupled power transmission path (high gear) composed of the sprocket 24, driver 16, clutch mechanism 64, ring gear 40, one way clutch 60 and slave member 18.

Figure 3:
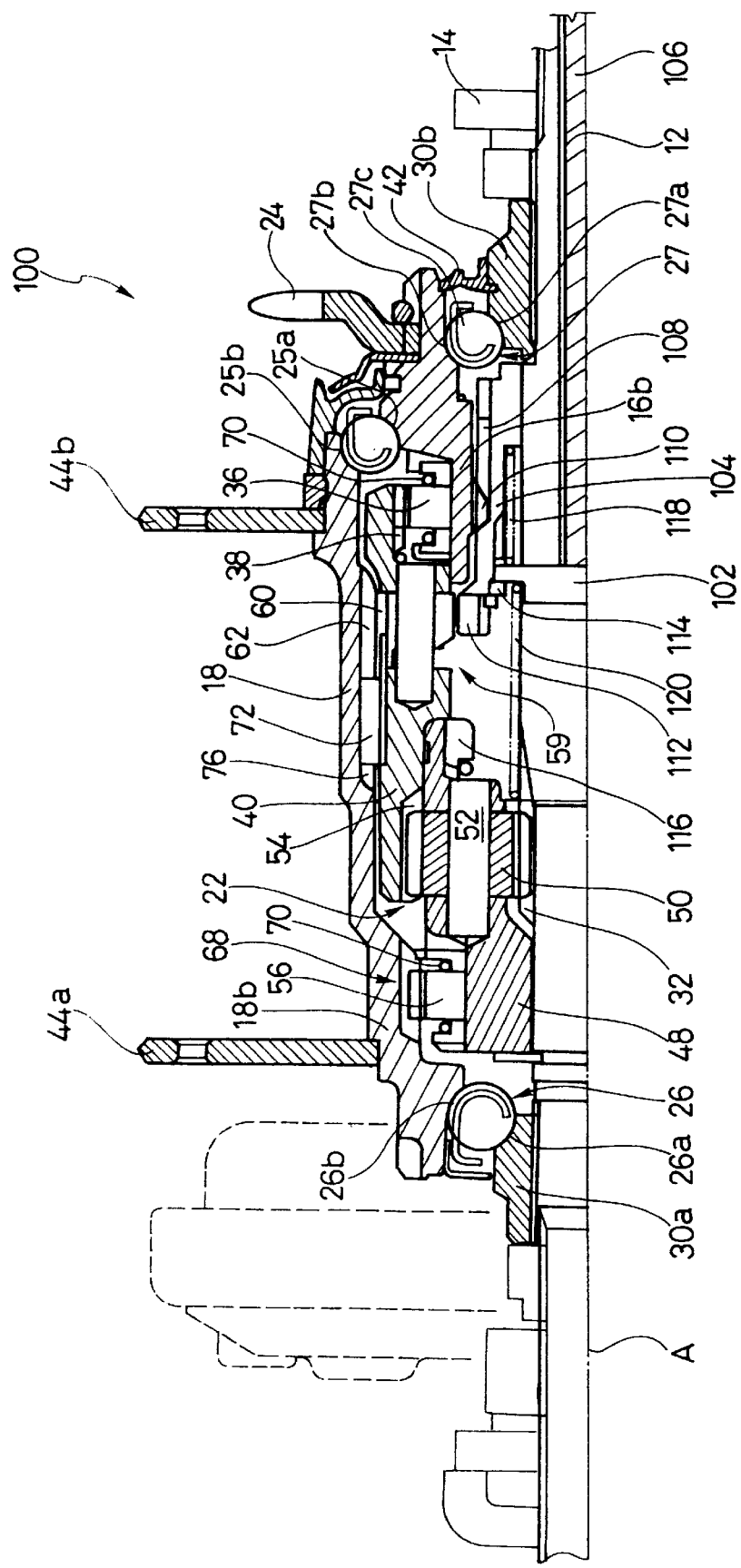
FIG. 3 is a partial cross-sectional side view of an internal shifting hub showing the clutch body in the first position in accordance with a second embodiment of the present invention.
Figure 4:
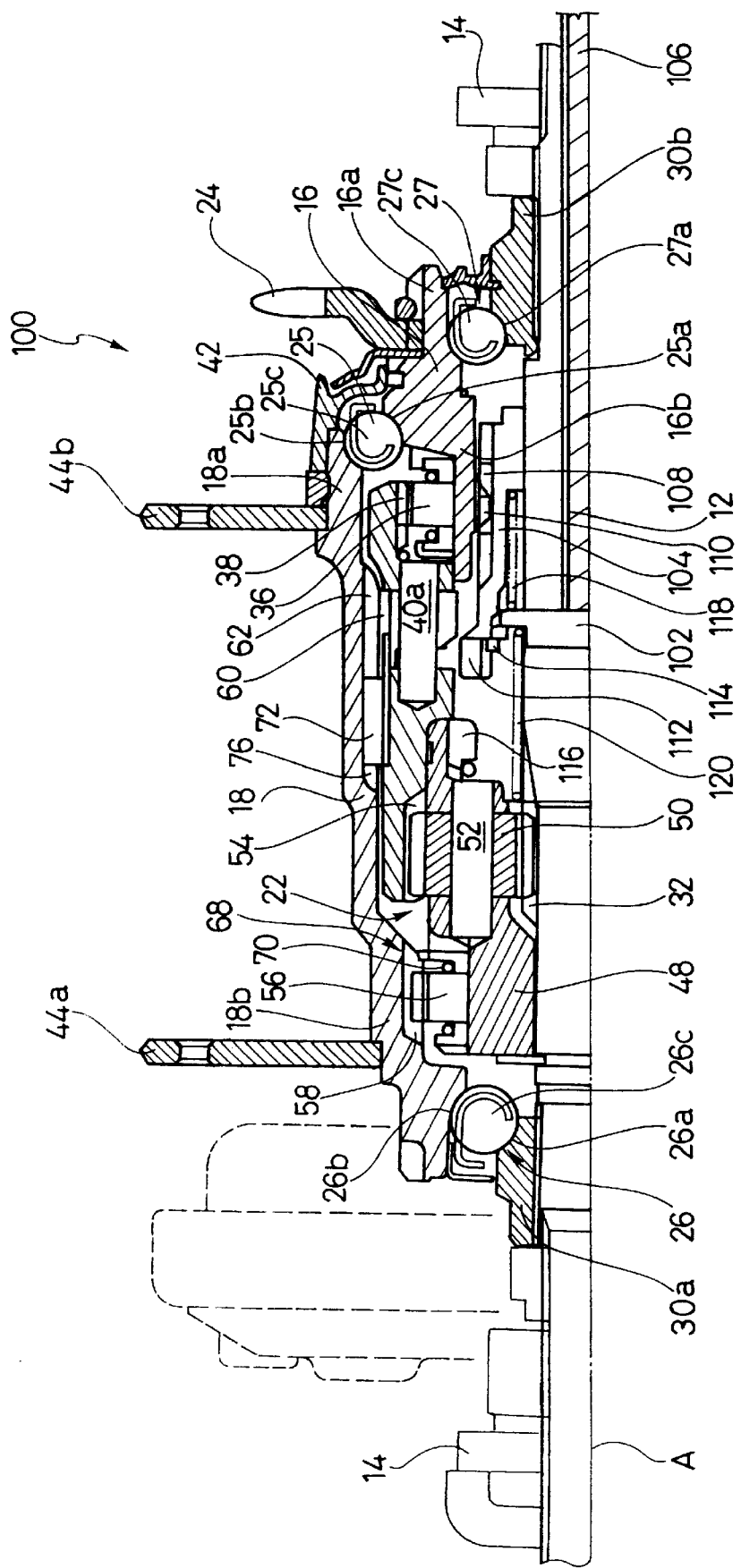
FIG. 4 is a partial cross-sectional side view of the internal shifting hub of FIG. 3 showing the clutch body in the intermediate position.

Referring to FIGS. 3–4, an internal shifting hub 100 for a bicycle according to a second embodiment of the invention is shown. This embodiment operates similar to the first embodiment, however, it includes low, middle and high gear transmission paths. The hub 100 includes a key 102 and clutch body 104 that may be set in a first position (FIG. 3), an intermediate position (FIG. 4), and a second position (FIG. 5) in the axial direction of axle 12 using a clutch operator 106. The clutch body 104 is able to move along the axis A and is able to rotate on the hub axle 12. The clutch body 104 is provided with an outer spline component 108 that engages with an inner spline component 110 formed around the inner peripheral surface of the driver. As a result, the clutch body 104 rotates integrally with driver 16 and is able to slide in the direction of the axis A with respect to the driver 16.

At least one engagement component 112 (and preferably a plurality of engagement components 112) project outwardly from the left end of the clutch body 104. The engagement component 112 is adapted to engage clutch pawl 60 when the clutch body 104 is in the first position and a depression 116 formed in carrier 48 when the clutch body 104 is in the second position. The clutch body 104 also includes a key stop 114 projecting therefrom against which the key 102 abuts when in the first, intermediate and second positions. A pair of springs 118 and 120 are provided to bias the key 102 in opposite directions.

To reposition the clutch body 104 the clutch operator 106, which may be a push rod that extends down an opening in the axle 12, is pressed or pulled by the rider to reposition the key 102, and therefore, the clutch body 104. When pushing the clutch operator 106 the urging of spring 120 must be overcome to reposition the key. When pulling the clutch operator, the urging of spring 118 must be overcome to reposition the key.

When the clutch body 104 is positioned at the first position, the engagement component 112 engages a tapered depression 60a (see FIG. 6a) in clutch pawl 60 thereby pivoting clutch pawl 60 into the disengaged position, where clutch pawl 60 is not in contact with first ratchet tooth 62. In this state, clutch pawl 60 does not engage first ratchet tooth 62. Accordingly, automatic shift control mechanism 59 is never in the upshifted position and the hub 100 is maintained in the low gear ratio (1:0.73 in the example above).

When the clutch body 104 is positioned at the intermediate position, as shown in FIG. 4, the engagement component 112 is not in contact with anything, therefore, the transmission 100 is allowed to operate in the manner described above in the first embodiment (transmission 10).

Figure 5:
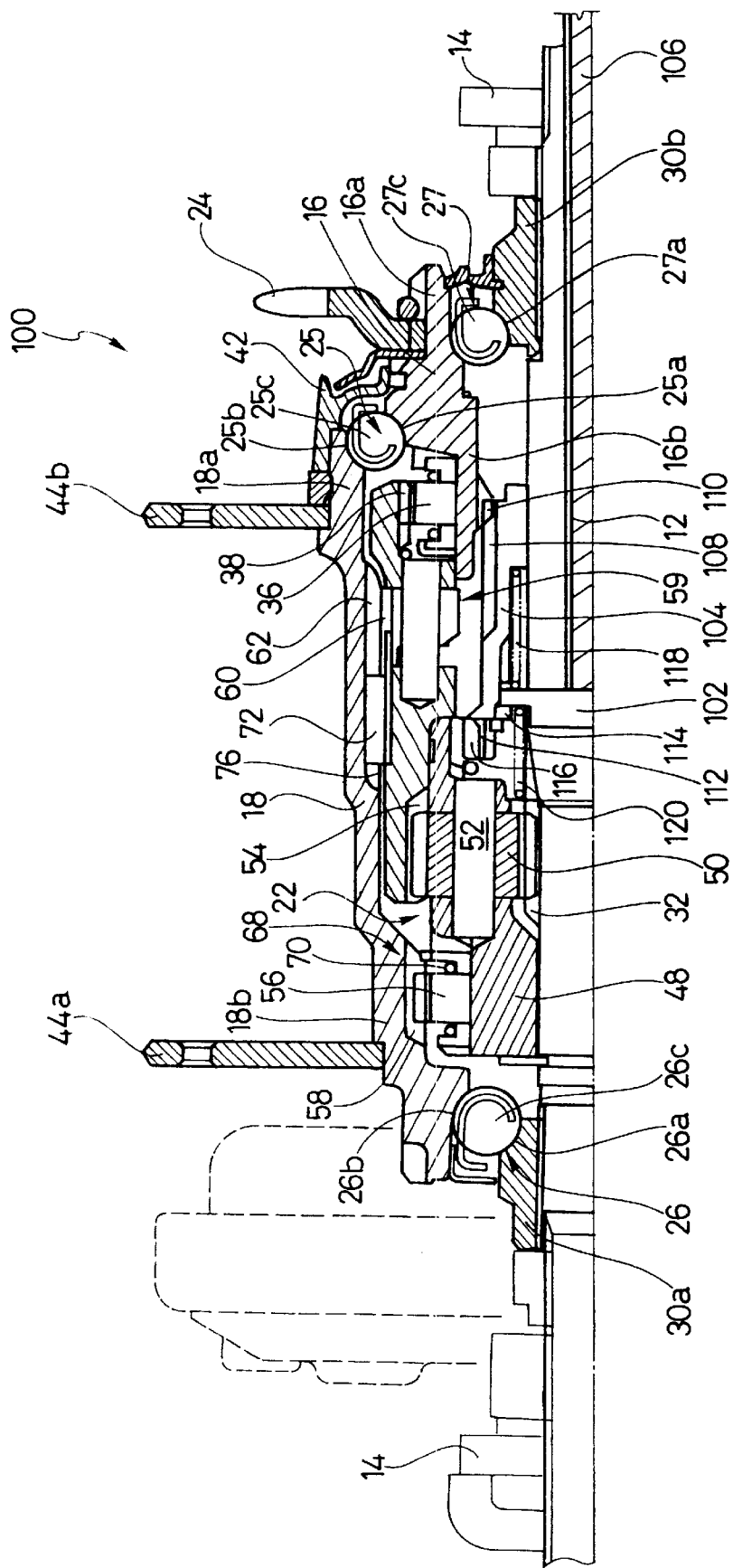
FIG. 5 is a partial cross-sectional side view of the internal shifting hub of FIG. 3 showing the clutch body in the second position.

When the clutch body 104 is positioned at the second position, as shown in FIG. 5, the engagement component 112 is in contact with depression 116 in carrier 48 and the forward rotational power of the driver 16 is transmitted to the carrier 48. Therefore, when the transmission 100 is in its starting position (as shown in FIG. 6a) where clutch pawl 60 is not engaged with first ratchet tooth 62, the carrier 48 via clutch mechanism 68 meshes with the slave member 18, thereby rotating the slave member 18 at the same rotational speed as the driver and providing a gear ratio of 1:1 (referred to herein as the middle gear ratio).

It will be understood that in the second position, while the driver 16 (via clutch body 104) is driving the carrier 48, the carrier 48 is in turn causing the ring gear 40 to rotate and clutch pawl 60 to rotate. As described above, when the automatic shift control mechanism 59 is in the disengaged state (FIG. 6a), clutch pawl 60 is not causing the slave member 18 to rotate. However, when the automatic shift mechanism 59 reaches the upshifted position (FIG. 6b) and clutch pawl 60 engages first ratchet tooth 62, the slave member 18 rotates synchronously with the ring gear 40 at a gear ratio that is higher than 1:1. In this state, the forward rotational power received by the driver 16 through the sprocket 24 and chain is transmitted via the clutch body 104 to the carrier 48, as described above. Since clutch pawl 60 is engaged with first ratchet tooth 62, the forward rotational power imparted to the carrier 48 is boosted through the work of the planet gear 50 and the sun gear 32 before being transmitted to the ring gear 40, and is then transmitted to the slave member 18 through the clutch pawl 60. Using the exemplary numbers set forth above, the high gear ratio is 1:1.36. When this occurs, the ring gear 40 and slave member 18 rotate faster than the driver 16 and the carrier 48, and therefore clutch pawls 36 and 56 are disengaged from and overrun by teeth 38 and 58 respectively.

The hub 100 provides the following gear ratios (the ratios in parentheses are those provided when the exemplary numbers provided above are employed):

| Clutch body position | Gear ratio |
| --- | --- |
| First | always low gear (1:0.73) |
| Intermediate | starts in low (1:0.73) and automatically shifts to middle (1:1) |
| Second | starts in middle (1:1) and automatically shifts to high (1:1.36) |

When the clutch body 104 is in the first position, the internal shifting hub 100 has only one path of power transmission because of the presence of the a driver 16, planetary gear mechanism 22, clutch body 104 and slave member 18. This transmission path is:

a low gear power transmission path (low gear) composed of the sprocket 24, driver 16, clutch mechanism 64, ring gear 40, planet gear 50, carrier 48, clutch mechanism 68 and slave member 18 (1:0.73).

When the clutch body 104 is in the intermediate position, the internal shifting hub 100 has the following paths of power transmission because of the presence of the a driver 16, automatic shift control mechanism 59, planetary gear mechanism 22, clutch body 104 and slave member 18:

a low gear power transmission path (low gear) composed of the sprocket 24, driver 16, clutch mechanism 64, ring gear 40, planet gear 50, carrier 48, clutch mechanism 68 and slave member 18 (1:0.73); and a middle gear transmission path composed of the sprocket 24, driver 16, clutch mechanism 64, ring gear 40, automatic shift control mechanism 59 and slave member 18 (1:1).

When the clutch body 104 is in the second position, the internal shifting hub 100 has the following paths of power transmission because of the presence of the a driver 16, automatic shift control mechanism 59, planetary gear mechanism 22, clutch body 104 and slave member 18:

a middle gear transmission path composed of the sprocket 24, driver 16, clutch body 104, carrier 48, clutch mechanism 68 and slave member 18 (1:1); and a high gear power transmission path composed of the sprocket 24, driver 16, clutch body 104, carrier 48, planet gear 50, ring gear 40, automatic shift control means 59 clutch mechanism 68 and slave member 18.

Figure 9:
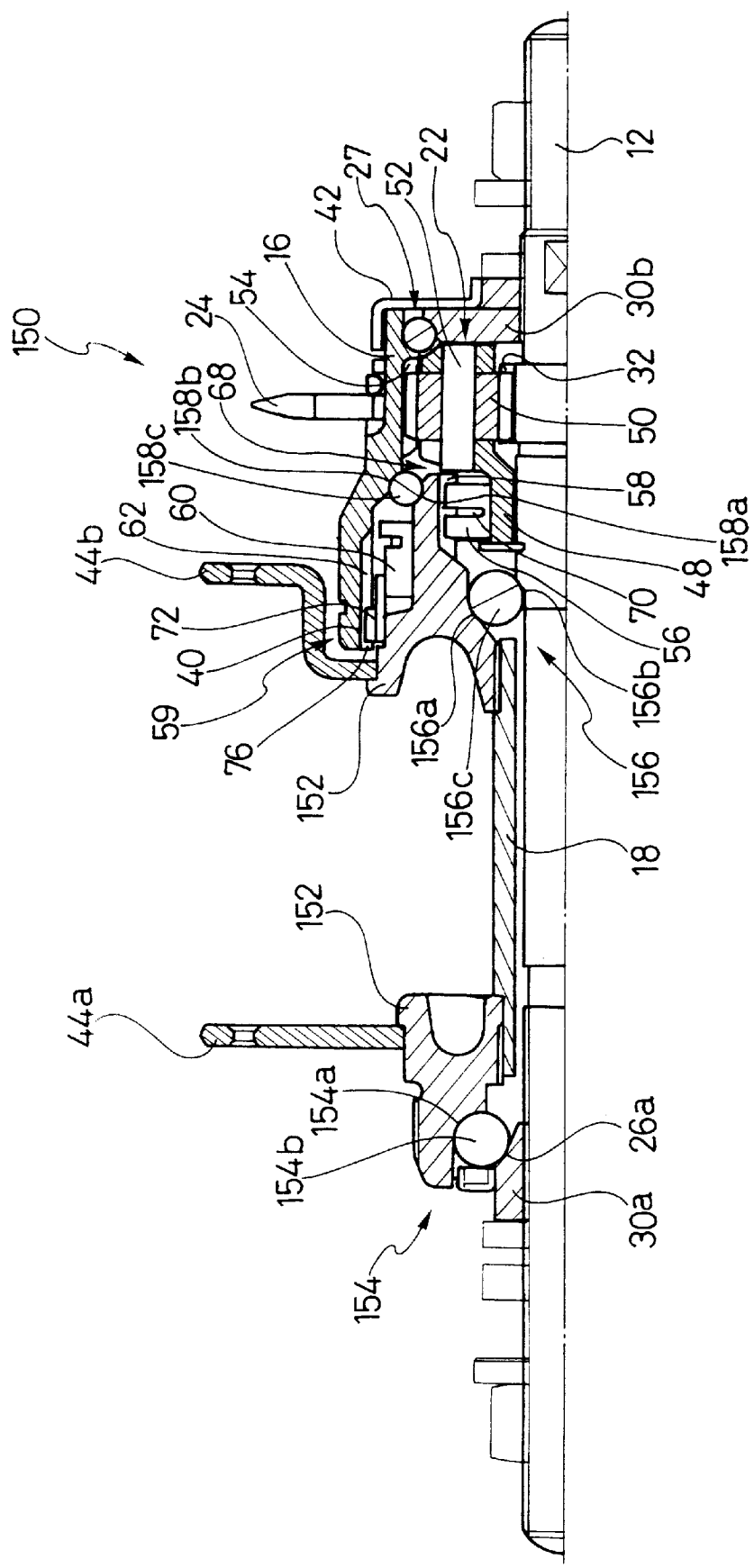
FIG. 9 is a partial cross-sectional side view of an internal shifting hub showing clutch pawl 60 in the disengaged position, in accordance with a third embodiment of the present invention.
Figure 10:
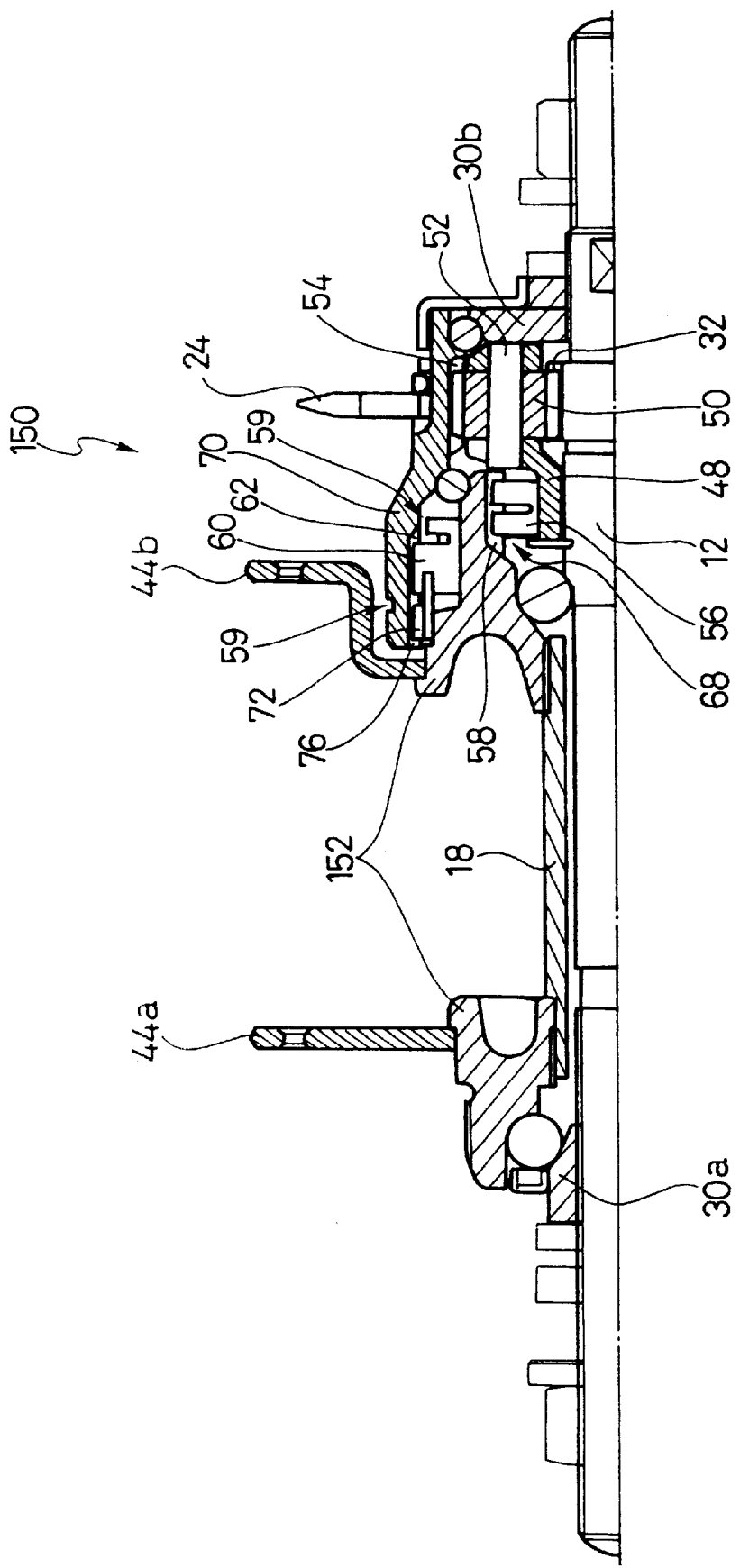
FIG. 10 is a partial cross-sectional side view of the internal shifting hub of FIG. 9 showing clutch pawl 60 in the engaged position.

Referring to FIGS. 9–10, an internal shifting hub 150 for a bicycle according to a third embodiment of the invention is shown. In this embodiment, the ring gear 40 and driver 16 of the first embodiment are a single unitary piece. In other words, the driver 16 has a set of teeth 54 on an inner surface thereof, thereby making the driver 16 essentially a ring gear. Because the ring gear and driver are formed integrally with one another, clutch mechanism 64 is omitted. The planetary gear mechanism 22 is disposed laterally adjacent to and on the right side of the slave member 18 therefore allowing for less overall components in the internal shifting hub 150. Most of the components in the third embodiment (transmission 150) are the same as those in the first embodiment (transmission 10). Therefore, the components are numbered the same in FIGS. 9 and 10 as they are in FIGS. 1 and 2. Also, FIGS. 6a–7b apply equally to the third embodiment as they do to the first and second embodiments.

Located radially inwardly of the ring gear 40 and rotatably mounted around the hub axle 12 is a first portion 152 of slave member 18. The first portion 152 is rotatably mounted on the hub axle 12 by bearing components 154 and 156. Bearing component 154 comprises hub cone surface 26a, ball race surface 154a and a plurality of balls 154b interposed between the hub cone surface 26a and ball race surface 154a. The bearing component 156 comprises ball race surfaces 156a and 156b, and a plurality of balls 156c interposed between the ball race surfaces 156a and 156b. The first portion 152 is also rotatably communicated with the driver 16 by bearing component 158, which comprises ball race surfaces 158a and 158b, and a plurality of balls 158c interposed between the ball race surfaces 158a and 158b.

Automatic shift control mechanism 59 is disposed between first portion 152 and ring gear 40, as shown in FIGS. 9 and 10. First and second ratchet teeth 62, 76 are disposed on the inner surface of driver 16/ring gear 40. One way clutch pawl 60 is mounted on the first portion 152 of the slave 18. Clutch cage 72 partially surrounds and rotationally cooperates with first portion 152. Clutch mechanism 68 is disposed between carrier 48 and first portion 152. It will be understood that the first portion 152 is directly connected to the remainder of the slave member 18. Therefore, the slave member 18 always rotates synchronously with the first portion 152.

The internal shifting hub 150 has the following paths of power transmission:
- a downshifted power transmission path (low gear) composed of the sprocket 24, driver 16 (ring gear 40), planet gear 50, carrier 48, clutch mechanism 68 and slave member 18 (first portion 152); and
- a direct-coupled power transmission path (high gear) composed of the sprocket 24, driver 16 (ring gear 40), automatic shift control mechanism 59 and slave member 18 (first portion 152).

The embodiments of the present invention recited herein are intended to be merely exemplary and those skilled in the art will be able to make numerous modifications to them without departing from the spirit of the present invention. All such modifications are intended to be within the scope of the present invention as defined by the claims appended hereto.

What is claimed is:

1. An internal transmission device for a bicycle, said device comprising:
   a slave member,
   a driver,
   a planetary gear mechanism disposed between said driver and said slave member, and
   an automatic shift control mechanism actuated relative to a rotational angle of the driver in a driving direction, said automatic shift control mechanism comprising a first one way clutch, a clutch control member, and a first abutment member,
   wherein said driver and said slave member rotate at substantially the same speed when said first one way clutch engages said first abutment member, and wherein said slave member rotates at a different speed than said driver when said first one way clutch is not engaged with said first abutment member.

2. The internal transmission device of claim 1 wherein said first abutment member is disposed on an inner peripheral surface of said slave member.

3. The internal transmission device of claim 1 wherein said automatic shift control mechanism further comprises a second abutment member.

4. The internal transmission device of claim 2, wherein said first abutment member is positioned to be engaged by said first one way clutch.

5. The internal transmission device of claim 3 wherein said second abutment member is positioned to be engaged by said clutch control member.

6. The internal transmission device of claim 3 wherein said first abutment member is staggered with said second abutment member.

7. The internal transmission device of claim 1 wherein said automatic shift control mechanism comprises only one first abutment member.

8. The internal transmission device of claim 3 wherein said automatic shift control mechanism comprises only one second abutment member.

9. The internal transmission device of claim 6 wherein said first abutment member is adjacent said second abutment member.

10. The internal transmission device of claim 3 wherein said first abutment member is aligned with said second abutment member.

11. The internal transmission device of claim 1 wherein said first one way clutch comprises a first pawl.

12. The internal transmission device of claim 1 wherein said clutch control member comprises a clutch cage.

13. The internal transmission device of claim 12, wherein said clutch cage comprises a pawl cage.

14. The internal transmission device of claim 1 wherein said clutch control member is rotatable relative to said planetary gear mechanism.

15. The internal transmission device of claim 1 wherein said clutch control member is rotatable with the slave member.

16. The internal transmission device of claim 1 wherein the planetary gear mechanism comprises a ring gear, a planet gear, a planet gear carrier and a sun gear.

17. The internal transmission device of claim 16 wherein said clutch control member is rotatable relative to said ring gear.

18. The internal transmission device of claim 3 wherein said clutch control member has an end that is bent radially outwardly.

19. The internal transmission device of claim 1 wherein a tip end of the first one way clutch rotates in a direction opposite to the driving direction.

20. The internal transmission device of claim 16 wherein said first one way clutch is disposed on said ring gear.

21. The internal transmission device of claim 20 wherein a second one way clutch is disposed on said planet gear carrier.

22. The internal transmission device of claim 1 further comprising an axle and a clutch body, wherein said clutch body is rotatable around said axle and movable in an axial direction.

23. The internal transmission device of claim 22 wherein said clutch body includes a key member, and wherein said clutch body and said key member are externally operated by a push rod.

24. The internal transmission device of claim 22 wherein said automatic shift control mechanism is actuated relative to the rotational angle of said driver in said driving direction when said clutch body is positioned at a first position.

25. The internal transmission device of claim 1 wherein said planetary gear mechanism is disposed radially inwardly of said slave member.

26. The internal transmission device of claim 1 wherein said planetary gear mechanism is disposed radially inwardly of said driver.

27. The internal transmission device of claim 1 wherein said planetary gear mechanism is disposed laterally adjacent to said slave member.

28. The internal transmission device of claim 16 wherein said ring gear is formed integrally with said driver.

29. The internal transmission device of claim 1 wherein the rotational angle of said driver in said driving direction is less than 360°.

30. The internal transmission device of claim 1 wherein the rotational angle of said driver in said driving direction is less than 720°.

31. The internal transmission device of claim 22 wherein said clutch body can be positioned in at least first, intermediate and second positions, wherein the gear ratio is fixed when said clutch body is in said first position, the gear ratio is automatically changed from a low gear ratio to a middle gear ratio in said intermediate position, and wherein said gear ratio is automatically changed from said middle gear ratio to a high gear ratio in said second position.

32. The internal transmission device of claim 1 wherein said slave member comprises a hub shell.

33. The internal transmission device of claim 16 wherein said automatic shift control mechanism is actuated relative to the rotational angle of said driver in said driving direction with different rotational angles between said ring gear and said slave member.

34. The internal transmission device of claim 18 wherein said end of said clutch control member that is bent radially outwardly is adapted to engage said second abutment member.

35. The internal transmission device of claim 28 wherein said first abutment member is disposed on the inner peripheral surface of said ring member.

36. An internal transmission device for a bicycle, said device comprising:
   a slave member,
   a driver,
   a planetary gear mechanism disposed between said driver and said slave member, and
   an automatic shift control mechanism actuated relative to a rotational angle of the driver in a driving direction, wherein said automatic shift control mechanism comprises a starting position and an upshifted position, and wherein a starting gear ratio between said driver and said slave member in said start position is substantially 1:0.73.

37. The internal transmission device of claim 36 wherein an upshifted gear ratio between said driver and said slave member in said upshifted position is substantially 1:1.

38. An internal transmission device for a bicycle, said device comprising:
   a slave member,
   a driver,
   a planetary gear mechanism disposed between said driver and said slave member, wherein the planetary gear mechanism comprises a ring gear, a planet gear, a planet gear carrier and a sun gear, and
   an automatic shift control mechanism actuated relative to a rotational angle of the driver in a driving direction, said automatic shift control mechanism comprising a first one way clutch disposed on said ring gear, a clutch control member, and a first abutment member, wherein a second one way clutch is disposed on said planet gear carrier, and wherein a third one way clutch is disposed on said driver.

39. An internal transmission device for a bicycle, said device comprising:
   a slave member,
   a driver,
   a planetary gear mechanism disposed between said driver and said slave member, and
   an automatic shift control mechanism actuated relative to a rotational angle of the driver in a driving direction, wherein said automatic shift control mechanism comprises a first one way clutch, a clutch control member, and first and second abutment members, wherein said clutch control member has an end that is bent radially outwardly and wherein said end includes a notch defined therein, wherein said notch is adapted to receive said first one way clutch.

40. An internal transmission device for a bicycle, said device comprising:
   a slave member,
   a driver,
   a planetary gear mechanism disposed between said driver and said slave member, and
   an automatic shift control mechanism actuated relative to a rotational angle of the driver in a driving direction, said automatic shift control mechanism comprising a first one way clutch, a clutch control member and a first abutment member,
   wherein said driver and said slave member are linked for integral rotation when said first one way clutch engages said first abutment member, and wherein said driver and said slave member rotate relative to one another when said first one way clutch is not in engagement with said first abutment member.

41. An internal transmission device for a bicycle, said device comprising:
   a) a hub axle having a sun gear formed integrally therewith,
   b) a driver rotatably mounted to said hub axle, said driver including a first clutch pawl pivotably mounted thereon, wherein said first clutch pawl pivots between an engaging position and a disengaging position,
   c) a slave member rotatably mounted to said hub axle and rotatable independently of said driver, said slave member having a set of teeth formed on an inner surface thereof,
   d) a planet gear mechanism comprising,
      i) a ring gear having first and second sets of inner teeth,
      ii) a planet gear, and
      iii) a carrier rotatably mounted on said hub axle and carrying said planet gear, said planet gear being disposed between said sun gear and said second set of teeth on said ring gear, said carrier having a second clutch pawl pivotably mounted thereon for engaging said set of teeth on said inner surface of said slave member, and
   e) an automatic shift control mechanism that is actuated when said slave member rotates relative to said driver a predetermined rotational angle θ, said automatic shift control mechanism comprising
      i) a third clutch pawl mounted on said ring gear,
      ii) a clutch control member having an end that is bent radially outwardly and that includes a notch defined therein, and
      iii) a first abutment member disposed on the inner peripheral surface of said slave member.

42. A method of power transmission in a bicycle component, the method comprising the steps of
   a) rotationally powering a driver,
   b) wherein said driver rotationally powers a ring gear,
   c) wherein said ring gear rotationally powers a planet gear carrier,
   d) wherein said planet gear carrier rotationally powers a slave member, e) actuating an automatic shift control mechanism by engaging a first one way clutch on said ring gear with said slave member, wherein said automatic shift control mechanism is actuated relative to a rotational angle of said driver in a driving direction, and f) wherein said first one way clutch rotationally powers said slave member independently of said planet gear carrier.

43. The method of claim 42 wherein said driver and said ring gear are formed integrally with one another.

44. The method of claim 42 wherein said automatic shift control mechanism includes a clutch control member having an end bent radially outwardly, and wherein said end defines a notch therein.

45. The method of claim 44 wherein said automatic shift control mechanism includes a first abutment member disposed on an inside surface of said slave member, and wherein before step (a) said first one way clutch is received in said notch, but is not engaged with said first abutment member.

46. The method of claim 45 wherein between steps (d) and (e) said first one way clutch engages said first abutment member.

47. The method of claim 44 wherein said automatic shift control mechanism includes first and second abutment members disposed on an inside surface of said slave member, and wherein before step (a) said first one way clutch is disengaged from said notch and is disengaged from said first abutment member.

48. The method of claim 47 wherein between steps (d) and (e) said end of said clutch control member that is bent radially outwardly engages said second abutment member, thereby rotating said clutch control member and said slave member approximately synchronously until said first one way clutch engages said first abutment member.

49. The method of claim 42 wherein a second one way clutch is disposed between said driver and said ring gear for transmitting rotational power from said driver to said ring gear.

50. The method of claim 49 wherein a third one way clutch is disposed between said planet carrier and said slave member for transmitting rotational power from said planet carrier to said slave member.

51. The method of claim 50 wherein said ring gear transmits rotational power to a planet gear and wherein said planet gear transmits rotational power to said planet carrier.

* * * * *